United States Patent
Wu

(10) Patent No.: US 8,248,721 B2
(45) Date of Patent: Aug. 21, 2012

(54) LENS DRIVING DEVICE WITH PIEZOELECTRIC ACTUATOR

(75) Inventor: Sung-Ching Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 15 days.

(21) Appl. No.: 12/981,498

(22) Filed: Dec. 30, 2010

(65) Prior Publication Data

US 2012/0099212 A1   Apr. 26, 2012

(30) Foreign Application Priority Data

Oct. 26, 2010   (TW) ................. 99136431 A

(51) Int. Cl.
  *G02B 7/02* (2006.01)
(52) U.S. Cl. .................. 359/824; 359/822; 359/819
(58) Field of Classification Search .................. 359/811, 359/813, 819, 821–824
See application file for complete search history.

(56) References Cited

U.S. PATENT DOCUMENTS

2006/0192461 A1*  8/2006  Topliss et al. ................. 310/348
2008/0225139 A1*  9/2008  Nomura et al. ............ 348/240.3

* cited by examiner

*Primary Examiner* — Thomas K Pham
*Assistant Examiner* — Brandi Thomas
(74) *Attorney, Agent, or Firm* — Altis Law Group, Inc.

(57) ABSTRACT

A lens driving device includes a fixed housing, a movable lens holder movably received in the fixed housing, a base mounted to the fixed housing, a guide rod, and a piezoelectric actuator. The fixed housing has an opening defined at a corner thereof. The lens holder has a through hole formed therein, and the through hole is arranged opposite to the opening, a central axis of the through hole is parallel with an optical axis of the lens. The guide rod extends through the through hole, two ends of the guide rod coupled to the fixed housing and the base. The piezoelectric actuator is fixedly arranged in the opening of the fixed housing and in contact with an outer side surface of the lens holder. The piezoelectric actuator is deformable in itself along the optical axis thereby driving the lens holder to move along the guide rod in the first receiving space.

8 Claims, 2 Drawing Sheets

LENS DRIVING DEVICE WITH PIEZOELECTRIC ACTUATOR

BACKGROUND

1. Technical Field

The present disclosure relates to lens driving devices, and particularly to a lens driving device with a piezoelectric actuator.

2. Description of Related Art

Cameras or mobile phones having cameras therein need lens driving devices to move the lens or lens assembly to achieve auto-focusing and zooming.

Voice coil motors are widely used as lens driving devices. However the magnets and coils of wire are used in the voice coil motors, as such weight of the lens driving devices cannot be reduced.

What is needed, therefore, is a lens driving device which can overcome the above shortcomings

BRIEF DESCRIPTION OF THE DRAWINGS

Many aspects of the present lens driving device can be better understood with reference to the following drawings. The components in the drawings are not necessarily drawn to scale, the emphasis instead being placed upon clearly illustrating the principles of the present lens driving device. Moreover, in the drawings, like reference numerals designate corresponding parts throughout the several views.

DETAILED DESCRIPTION

Embodiments of the present lens driving device will now be described in detail below and with reference to the drawings.

Figure 1:
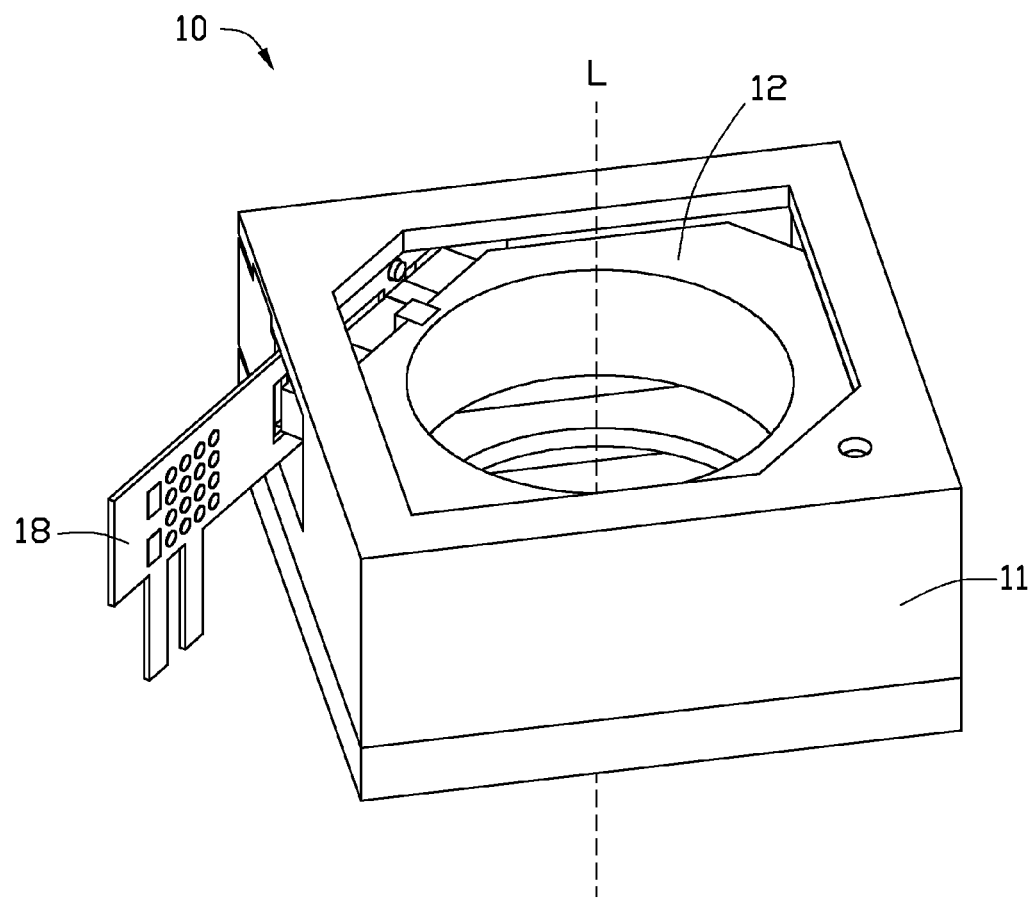
FIG. 1 is an isometric view of a lens driving device in accordance with one embodiment.
Figure 2:
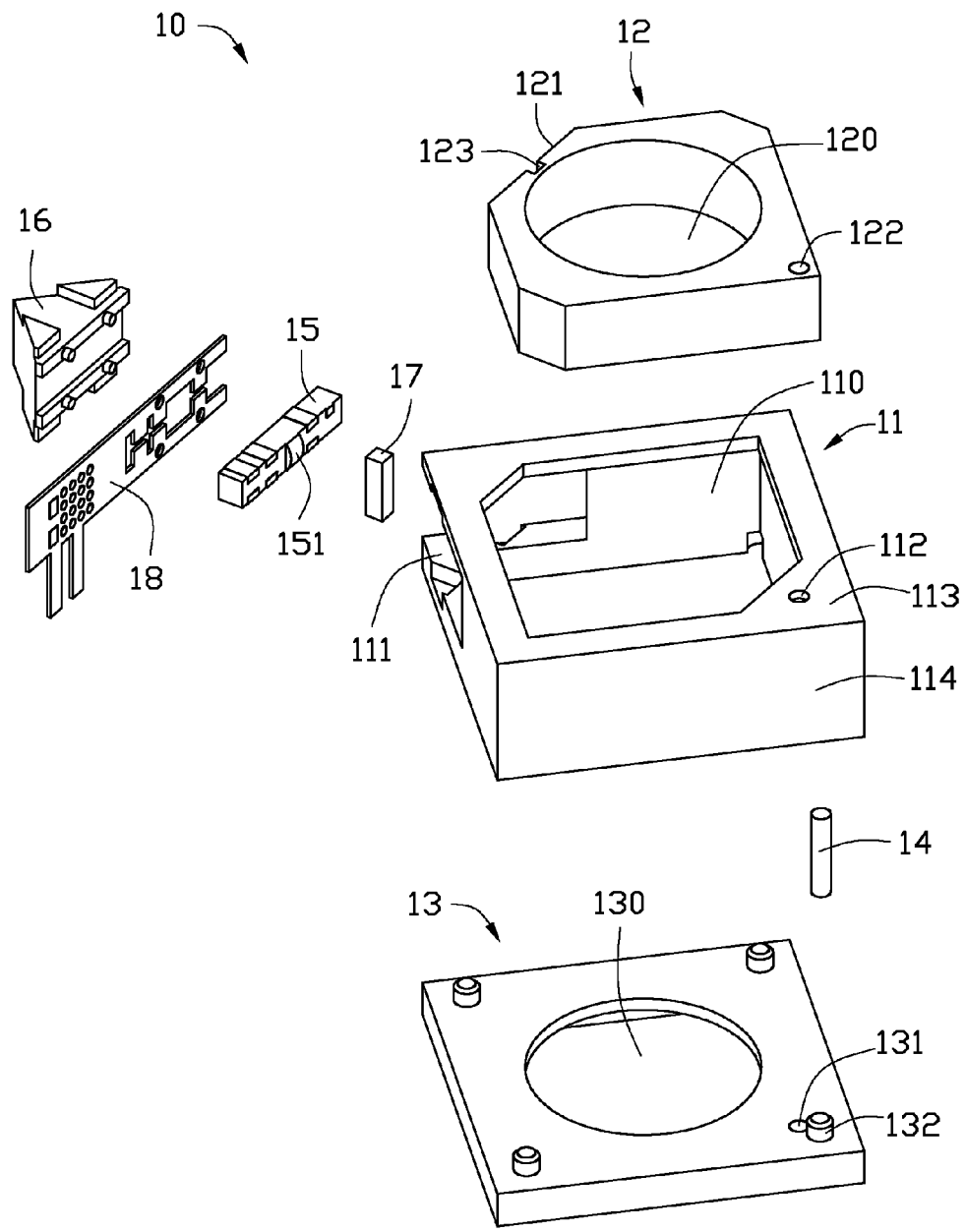
FIG. 2 is an exploded view of the lens driving device of FIG. 1.

Referring to FIGS. 1 and 2, a lens driving device 10 in accordance with one embodiment, is provided. The lens driving device 10 includes a fixed housing 11, a movable lens holder 12, a base 13, a guide rod 14, a piezoelectric actuator 15, a retaining member 16, a connecting post 17, and a circuit board 18.

The piezoelectric actuator 15 is made of a piezoelectric material. The circuit board 18 is used to power the piezoelectric actuator 15. When current goes through the piezoelectric actuator 15, the piezoelectric actuator 15 can generate a deformation corresponding to the direction of the current. In the present embodiment, the piezoelectric actuator 15 can generate deformations in itself along a central axis L of the lens driving device 10 corresponding to directions of the current applied thereon. The piezoelectric actuator 15 has a curved deformable surface 151.

The fixed housing 11 has a receiving space 110 formed therethrough. In the present embodiment, the fixed housing 11 is substantially rectangular, and includes a top wall 113 and four sidewalls 114. The top wall 113 and the four sidewalls 114 can be integrally formed. In the present embodiment, a bottom wall of the fixed housing 11 is omitted, and the base 13 is mounted to the bottom of the fixed housing 11. The receiving space 110 is configured for movably receiving the lens holder 12 therein. A corner of the top wall 113 has an engaging hole 112 formed therethrough, and a central axis of the through hole is parallel with that of the receiving space 110. An opposite corner of the fixed housing 11 where two sidewalls 114 connect has an opening 111 defined therein, in communication with the receiving space 110.

The lens holder 12 has a receiving space 120 formed therethrough. The receiving space 120 is configured for receiving a lens or a lens assembly therein. An optical axis of the lens or lens assembly is along the central axis L of the lens driving device 10. Engaging grooves (not shown) for engaging the lens or lens assembly can be formed in an inner wall of the receiving space 120. The lens holder 12 has a through hole 122 defined therein corresponding to the engaging hole 112 of the fixed housing 11. An outer surface 121 is formed on the outer wall of the lens holder 12, and a recess 123 is formed in the outer surface 121. The recess 123 is arranged opposite to the through hole 122, and a lengthwise direction of the recess 123 is parallel with the central axis L of the lens driving device 10.

The base 13 has a through hole 130 formed in a center thereof for passage of light. In the present embodiment, the base 13 is also substantially rectangular. Corresponding to the engaging hole 112 of the fixed housing 11, a corner of the base 13 has a blind hole 131 formed therein. In addition, four protrusions 132 are formed on four corners of the base 13. The protrusions 132 are configured for engaging in four blind holes (not shown) formed at four corners of the bottom of the fixed housing 11, such that the base 13 is fixed to the fixed housing 11.

The guide rod 14 is engaged in the blind hole 131 of the base 13 and extends through the through hole 122 of the lens holder 12. The guide rod 14 further extends into the engaging hole 112 of the top wall 113 of the fixed housing 11.

The lens holder 12 can be mounted in the receiving space 110 from the bottom of the fixed housing 11, and then the base 13 and the guide post 14 are mounted therein. A height of the receiving space 110 is greater than a height of the lens holder 12, which facilitates movement of the lens holder 12 in the receiving space 110 along directions of the central axis L. The outer surface 121 faces the opening 111 of the fixed housing 11. The connecting post 17 is fixedly engaged in the recess 123, and protrudes beyond the recess 123. The piezoelectric actuator 15 is mounted on the circuit board 18, and the retaining member 16 retains the piezoelectric actuator 15 in a fixed position in the opening 111. The circuit board 18 further extends out of the opening 111. In the present embodiment, the retaining member 16 is a block. The curved deformable surface 151 is in linear contact with the connecting post 17. A contact line between the connecting post 17 and the deformable surface 151 is substantially perpendicular to a lengthwise direction of the connecting post 17.

In application, when a current is applied to the piezoelectric actuator 15, the piezoelectric actuator 15 generates a deformation such as an extension at the deformable surface 151. As the deformable surface 151 is curved, the deformation has a component along the central axis L direction of the lens driving device 10. Along with this component of the deformation, the connecting post 17 together with the lens holder 12 will be moved along the central axis L of the lens driving device 10. The connecting post 17 may remain linear contact with the curved deformable surface 151 during the deformation of the deformable surface 151. Due to the guide rod 14, the movement of the lens holder 12 in the receiving space 110 will not deviate from the central axis L. The amount of movement caused by the deformations of the piezoelectric actuator 15 can be predetermined according to property of the piezoelectric material and magnitude of the current. In this way, autofocus and/or zooming can be achieved.

The present lens driving device 10 avoids the use of conventional magnets and coil of wire reducing weight of the lens driving device 10. The piezoelectric actuator 15 and the guide post 14 are arranged at opposite corners of the fixed housing.

In other embodiments, the connecting post 17 can be omitted, and the deformable surface 151 of the piezoelectric actuator 15 can directly contact the outer surface 121 of the lens holder 12.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A lens driving device, comprising:
    a fixed housing having a first receiving space defined therethrough and an opening defined in a sidewall thereof, the opening being in communication with the first receiving space;
    a movable lens holder configured for holding a lens, the lens holder movably received in the first receiving space, the lens holder having a through hole formed therein, the through hole being arranged at an opposite side of the first receiving space to the opening, a central axis of the through hole being parallel with an optical axis of a lens held by the lens holder, an outer side surface of the lens holder having a recess formed therein;
    a base having a light output opening formed therethrough, the fixed housing mounted on the base;
    a guide rod extending through the through hole, opposite ends of the guide rod respectively coupled to the fixed housing and the base;
    a piezoelectric actuator fixedly arranged in the opening of the fixed housing, the piezoelectric actuator contacting an outer side surface of the lens holder, the piezoelectric actuator being deformable along the optical axis direction so as to drive the lens holder to move along the guide rod in the first receiving space; and
    a connecting post being fixedly engaged in the recess and protruding beyond the recess to contact the piezoelectric actuator.

2. The lens driving device of claim 1, wherein the fixed housing comprises a top wall and four side walls integrally formed with the top wall, the top wall has an engaging hole formed in a corner at an opposite side of the first receiving space to the opening, one end of the guide rod being engaged in the engaging hole.

3. The lens driving device of claim 2, wherein the base has a blind hole formed therein, the other end of the guide rod being engaged in the blind hole.

4. The lens driving device of claim 1, wherein the lens holder has a second receiving space receiving the lens.

5. The lens driving device of claim 1, wherein the piezoelectric actuator has a curved deformable surface formed thereon, and the connecting post is in linear contact with the deformable surface.

6. The lens driving device of claim 5, wherein a contact line between the connecting post and the deformable surface is substantially perpendicular to a lengthwise direction of the connecting post.

7. The lens driving device of claim 1, further comprising a circuit board and a retaining member, the piezoelectric actuator being mounted on the circuit board, the retaining member being configured for retaining the piezoelectric actuator in the opening.

8. The lens driving device of claim 1, wherein the base has four protrusions formed thereon, a bottom of the fixed housing has four blind holes formed therein, and the protrusions are engaged in the respective blind holes.

* * * * *